Figure 1:
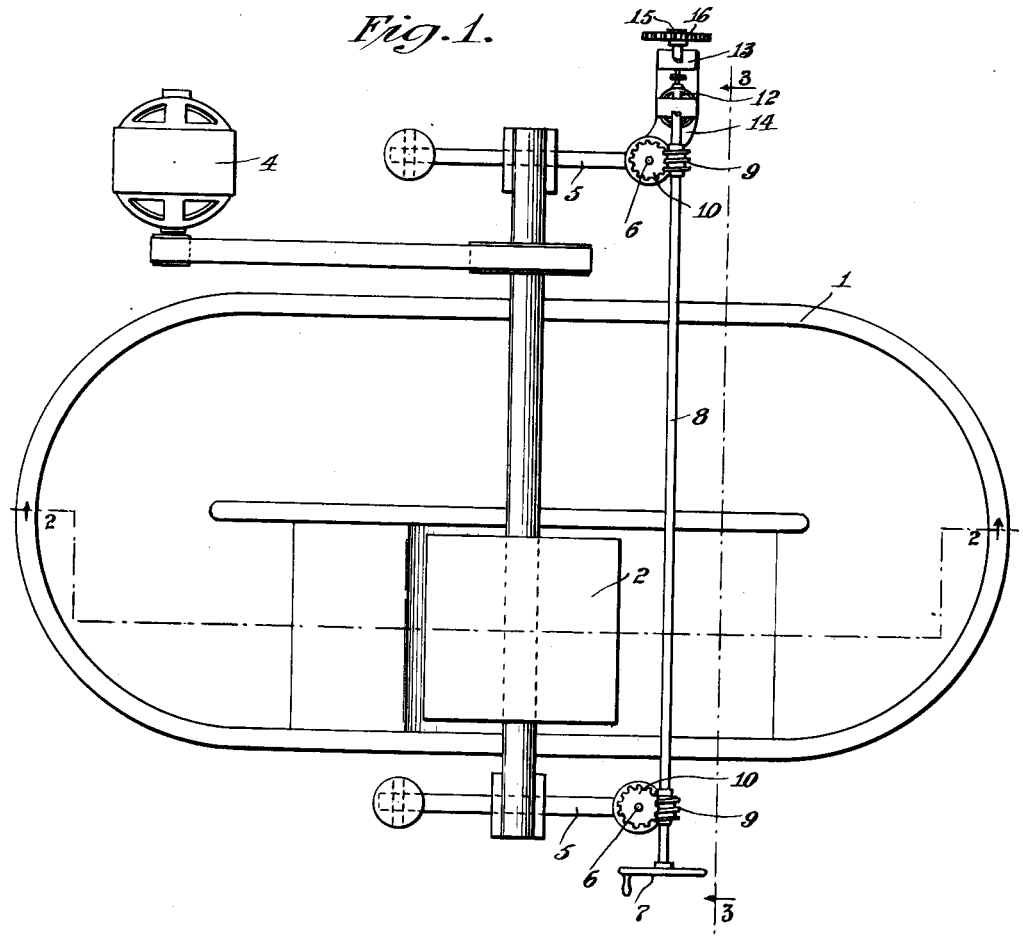

Oct. 18, 1932.   O. STAMETS ET AL   1,883,051
CONTROL FOR MOTOR DRIVEN APPARATUS
Filed May 31, 1930   3 Sheets-Sheet 1

Oct. 18, 1932.        O. STAMETS ET AL        1,883,051
CONTROL FOR MOTOR DRIVEN APPARATUS
Filed May 31, 1930        3 Sheets-Sheet 2

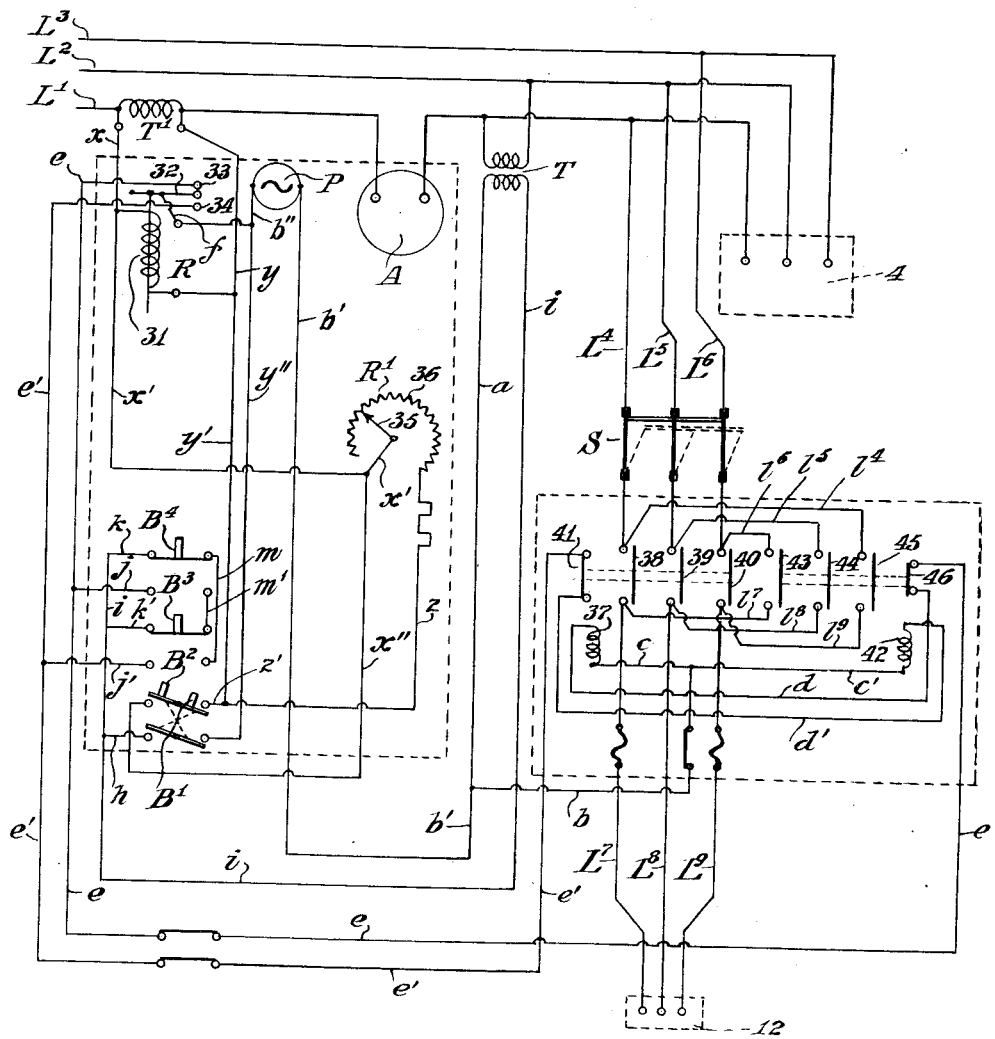

Patented Oct. 18, 1932

1,883,051

UNITED STATES PATENT OFFICE

OSCAR STAMETS, OF MILFORD, AND LEON A. DUCKWORTH, OF FINESVILLE, NEW JERSEY, ASSIGNORS TO RIEGEL PAPER CORPORATION, OF RIEGELSVILLE, NEW JERSEY, A CORPORATION OF NEW JERSEY

CONTROL FOR MOTOR-DRIVEN APPARATUS

Application filed May 31, 1930. Serial No. 458,576.

This invention relates to motor-driven apparatus, such for example as grinding machines of various kinds, in which the load upon the drive motor depends upon the frictional contact of the driven element with another element of the machine, either directly or through the material which is being worked between the two, and hence upon the positions of the two coacting elements relative one to the other; and the object thereof is to provide simple and effective means for automatically, and semi-automatically if desired, shifting the machine elements towards or from each other to thereby secure a uniform and/or any desired quality of the product being turned out by the machine.

To this end, the invention comprises, broadly, a small auxiliary motor which is operatively connected with and controls the position of one of the coacting machine elements, usually the driven element, and is in turn controlled by variations of current, above and below a predetermined adjustable value, in the circuit of the main drive motor. Usually, and preferably, additional means will be provided by which the auxiliary motor can, if desired, be controlled through a set of push-buttons, to thereby semi-automatically effect the required adjustments.

By way of illustration, our new control is well adapted and has been applied with entire satisfaction to the control of the beaters and engines which in the paper industry are employed for beating up and refining the paper stock.

In up-to-date paper mills the Hollander beaters and the Jordan refining engines are driven by electric motors, and the current input to the motors (which in a beater depends upon the amount of pressure of the beater roll upon the stationary bed-plate and in a refiner upon the set of its rotary tapered plug against the stationary grinding elements within the conical shell) is recorded by a curve drawing recording ammeter. The beater roll and the rotary plug are adjustably mounted and are shifted, the beater roll vertically and the rotary plug horizontally, by means of adjusting screws which heretofore have been operated by hand wheels. Thus, the engineer, watching and guided by the current input curve as recorded by the ammeter, will turn the hand wheel in a direction either to lower or raise the beater roll, or to tighten or loosen the set of the rotary plug, to thereby increase or decrease the load upon and hence the amount of current taken by the drive motor; and especially in the case of the refining engine, where the grinding elements are continuously being worn away, it requires close attention on the part of the engineer to at all times keep the plug set just hard enough within the shell to produce a uniformly ground or hydrated stock.

According to our present invention we effect the required adjustments automatically and accurately by operatively connecting the auxiliary or control motor with the usual lighter lift screws of the beater roll, or single screw for horizontally shifting the rotary plug of the refiner, connecting this motor up through a reversing switch with a suitable source of current supply—for instance, current derived from the main or drive motor leads through a suitable potential transformer—, and controlling the operative circuit connections of the motor by means of a relay regulatably actuated through a rheostat with current from a current transformer in one of the main motor leads. And by the manipulation of a set of push-button switches suitably connected up in the control circuits, we are able to short-circuit the magnet coil of the relay and to operate the motor to effect any desired adjustment of the movably mounted machine element.

The invention will be understood by reference to the accompanying drawings, in which—

Figure 2:
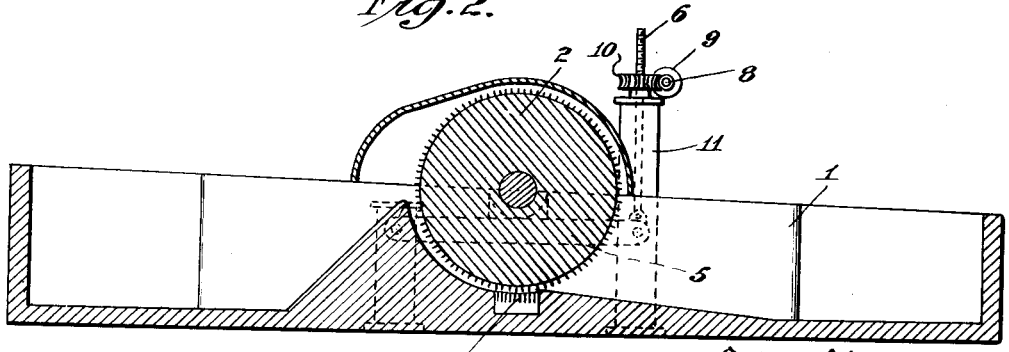
Figure 3:
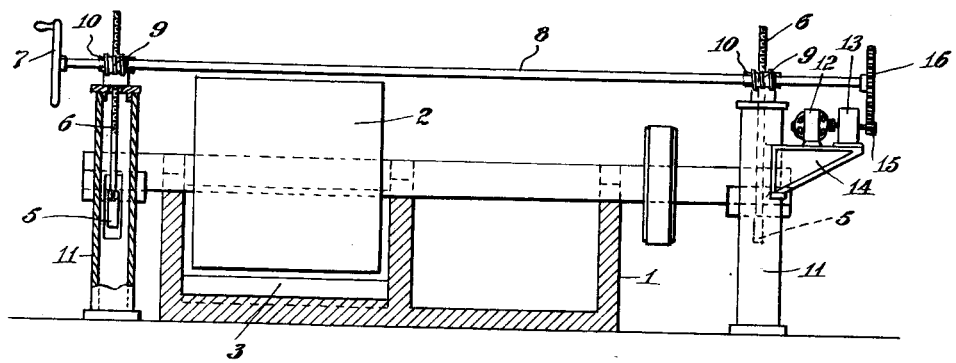
Figure 4:
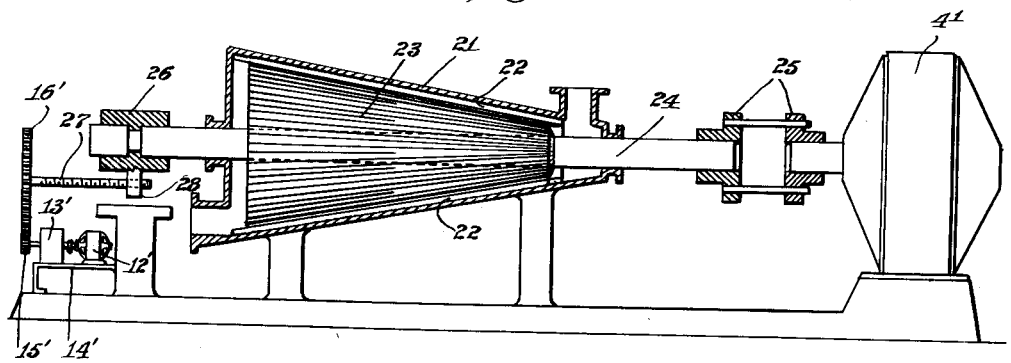

Figure 1 is a plan view of a Hollander beater with motor-drive, showing the auxiliary control motor geared to the shaft by which the lighter lift screws are operated to adjust its beater roll; Fig. 2 is a view of the beater in longitudinal section, on the line 2—2 of Fig. 1; Fig. 3 is a transverse section thereof, on the line 3—3 of Fig. 1; Fig. 4 is a more or less diagrammatic view, partly in longitudinal section and partly in side elevation of a refining engine, showing (the conical shell and the revolving plug in longitudinal section and) the auxiliary control motor geared to the screw by which the set of the tapered plug within the stationary shell is adjusted; and Fig. 5 is a diagram showing one practical arrangement of the electrical equipment and circuits through which the auxiliary motor is operated and automatically controlled from the leads of the main drive motor, and a set of push-button switches by means of which the automatic features of the control can be temporarily cut out and the auxiliary motor operated therefrom.

Referring first to Figs. 1–3, the Hollander beater consists of the usual tub 1, and, mounted therein, the beater roll 2 which revolves over the bed-plate 3 and is driven with belt-drive from the main motor 4, here a 3-wire A. C. motor; and for the contactual adjustment of the beater roll with the bed-plate, the shaft of the beater roll is journaled as usual in bearings carried by lighter bars 5 5 which are pivotally supported at one end and at the other end are supported by lighter lift screws 6 6, which screws are operated, according to present practice, by means of a hand-wheel 7 fixed to the end of a shaft 8 with worms 9 9 meshing with worm-gears 10 10 threaded on the lighter lift screws and bearing on the tops of the two lighter bar posts 11 11. The auxiliary or control motor 12—a one horse-power A. C. motor for example—and speed reducer 13, which is usually built at an integral part of the motor, are supported in position, as upon a bracket 14 attached to the side of one of the lighter bar posts 11, preferably at the back of the beater. The shaft of the speed reducer carries a pinion 15 which meshes with and drives a gear 16 fixed on the extended rear end of the worm-shaft 8.

Referring now to Fig. 4, the refining engine shown consists, as usual, of a conical shell 21 carrying on its inner surface the stationary grinding elements 22, and, mounted to rotate therein, the tapered plug 23 carried by a shaft 24 which is journaled in bearings in the heads of the shell and is driven by the drive motor 4' through a telescopic coupling 25. The opposite end of the shaft 24 rotates in a thrust bearing 26 which is mounted to move horizontally and is so moved, to set the plug against or away from the stationary grinding elements, by a screw 27 passing through a threaded lug 28 on the bottom of the thrust bearing. To operate this screw, the auxiliary control motor 12' and its speed reducer 13' are mounted upon a suitable bracket support 14', with the pinion 15' on the shaft of the speed reducer in driving engagement with the gear 16' fixed to the outer end of the screw in place of the usual hand-wheel.

As shown in Fig. 5, the electrical equipment for the operation and control of the auxiliary motor, whether used in connection with a beater or refining engine, comprises a standard, or any suitable, electromagnetically actuated reversing switch S, with interlocks, through which to operate the motor from the three leads of the main drive motor, a potential transformer T, such as a 200 watt transformer which with its primary coil connected across two of the main drive motor leads is adapted to supply therefrom a 110 volt current for the control circuits, a current transformer $T^1$ which is set into one of the main drive motor leads and is adapted to reduce the normal work current therein to a current of say five amperes, a suitable double-throw relay R, with say a one-half ampere coil, adapted for operation by current from the transformer $T^1$, an adjustable rheostat $R^1$, a pilot lamp P, a red bull's-eye lamp for example, the usual curve drawing ammeter A which is set into one of the main drive motor leads, and, preferably also, a push-button station with four push-button switches $B^1$ $B^2$ $B^3$ and $B^4$, of which switches $B^1$ and $B^2$ are interlocking in their action. The reversing switch and the two transformers may conveniently be mounted upon one panel, and the remaining equipment upon a second panel, the two panels being placed wherever desired.

The control equipment is provided with circuit connections and functions as follows:

The coil 31 of the relay is connected by wires $x$ and $y$ to the opposite terminals of the current transformer $T^1$; and the adjustable rheostat is shunted across this coil by wires $x'$, connecting its movable member 35 with the wire $x$, and $z$ and $y'$ connecting an end of its resistance 36 with the wire $y$, providing a bypass for an adjustable portion of the transformer current by which the relay may be caused to function on a rise or fall of current in the lead $L^1$, in which the transformer is inserted, from a value predetermined by the setting of the rheostat.

Let us assume, in the case of a beater, that a batch of stuff is to be beaten say for six hours, and that it is desired throughout to have the beater roll bear upon the bed-plate with a pressure which load the motor so as to call for a current input thereto of 45 amperes. As soon as the beater is filled, the drive motor is started, the rheostat $R^1$ of the control is set for 45 amperes, and the push-button $B^1$ is pressed to closed position to thereby place the relay R in automatic control. The closing of the contacts of push-button $B^1$ also closes a circuit through the pilot lamp P, from one side of the secondary winding of the potential transformer T by wires $a$ and $b'$ to the lamp and thence back by wires $b''$ and $y''$, contacts of push-button $B^1$, and wires $h$ and $i$ to the other side of the transformer winding, and by its light shows that the control is operating automatically The beater roll being now raised, there will be little or no load upon the main drive motor and the current input thereto will be well below 45 amperes. Accordingly, the current through the coil of the relay being below that for which the relay is set, its armature will be released and, dropping, will carry its movable contact 32 against lower fixed contact 34 and thereby establish a circuit from the potential transformer T, by wire $a$ $b$ $c'$ to and through coil 42 of reversing switch S, and thence back by wire $d'$, normally closed interlock 41 of switch S, wire $e'$, contacts 34 and 32 of the relay, wires $f$, $y''$, contacts of push-button $B^1$, and wires $h$ and $i$; whereupon, coil 42 being energized, will close the normally open contacts 43, 44 and 45 of the switch S, at the same time opening the normally closed interlock 46, to connect the auxiliary motor with the main motor leads $L^1$ $L^2$ $L^3$ through these contacts in manner to cause the motor to rotate in a direction to lower the beater roll. The auxiliary motor will continue to run until the beater roll has been lowered to contact with the bed-plate with a pressure calling for a 45 ampere input to the main drive motor, and when this occurs the coil 31 of the relay will receive a current which will effect the raising of its movable contact from fixed contact 34 to a central neutral position, thereby breaking the circuit through coil 42 of the reversing switch and stopping the auxiliary motor. And the control will operate to hold the input to the main drive motor at the predetermined 45 amperes, since, if the amperage drops, the coil of the relay again will drop the armature and as before described again start the auxiliary motor in a direction to lower the beater roll to increase the pressure and so restore the load upon and the current input to the main drive motor; or, if for any reason the current input to the main drive motor rises above 45 amperes, the increased current through its coil will cause the relay to lift its armature and, by closing contacts 32 and 33, entablish a circuit from the secondary winding of the potential transformer T by wires $a$ $b$ and $c$ to and through coil 37 of reversing switch S and thence back by wire $d$, closed interlock 46, wire $e$, contacts 33 and 32, wires $f$ and $y''$, contacts of push-button $B^1$ and wires $h$ and $i$, to thereby close the normally open contacts 38 39 and 40 of the switch, open the interlock 41, and operate the auxiliary motor in a direction to raise the beater roll until the current input to the main drive motor is restored to 45 amperes.

If it is desired to break the stuff in the beater for three hours with a 40 ampere input and then with a 50 ampere input during the next three hours, the beater man will first set the rheostat $R^1$ for 40 amperes, and then, at the end of three hours, will reset it for 50 amperes and thereupon the auxiliary motor will be connected up and operate to lower the beater roll until the curve recording ammeter shows 50 amperes and thereafter to hold the current input at this point until at the end of the sixth hour the beater man presses down the push-button $B^2$ and so opens the contacts of push-button $B^1$.

In case it is desired to operate the control semiautomatically, by manipulation of the push-buttons, the beater man presses button $B^2$ to closed position, thereby opening the contacts of button $B^1$ and establishing by wires $x'$ and $x''$, contacts of button $B^2$, and wires $z'$ and $y'$, a short circuit around the coil of relay R and rendering the relay inoperative. Then, if he wishes to raise the beater roll, he presses button $B^4$, to open its upper and close its lower set of contacts, and thereby establishes a circuit by wires $a$ $b$ and $c$ to and through coil 37 of reversing switch S and thence back by wire $d$, closed interlock 46, wires $e$ and $j$, closed lower contacts of button $B^4$, wire $m'$, closed upper contacts of button $B^3$ and wires $k'$ and $i$, to thereby operate the auxiliary motor in a direction to raise the beater roll; and this button is held pressed down until the beater roll has been raised to the desired height. Or, when the beater roll is to be lowered, the beater man presses push-button $B^3$ to open its upper and close its lower contacts, thereby establishing a circuit by wires $a$ $b$ and $c'$ to and through the coil 42 of reversing switch S, and thence back by wire $d'$, closed interlock 41, wires $e'$ and $j'$, closed lower contacts of button $B^3$, wire $m$, closed upper contacts of button $B^4$, and wires $k$ and $i$, to operate the auxiliary motor in the required direction and until the desired adjustment has been effected.

Again, assume that in a refining engine it is desired to grind the stock continuously with a pressure of its plug against the stationary grinding elements which will call for a current input of 95 amperes, for example, to the main drive motor. As soon as the engine has been started and the stock admitted thereto through its inlet opening, the rheostat $R^1$ is set accordingly, and the push-button $B^1$ is pressed to closed position for the automatic operation of the control, lighting the pilot lamp P. The relay R will thereupon act, in the manner already described, to close the circuit through the coil 42 of reversing switch S, and contacts 43, 44 and 45, will be closed and the auxiliary motor will be operated in a direction to shift the plug against the stationary grinding elements until, under the load due to the frictional pressure thus produced, the recording ammeter shows a 95 ampere input of current to the main drive motor, and then the relay will open the circuit through the coil of the reversing switch and stop the auxiliary motor. And thereafter, from time to time as the grinding elements wear away and the current taken by the main drive motor consequently falls, the auxiliary motor will be operated momentarily to shift the plug within the shell to restore the pressure and therefore the current input to the main drive motor. Thus, it will be seen that the control is operative automatically to maintain the required frictional contact between the plug and stationary grinding elements of the engine regardless of the continuous wearing away of its grinding surfaces.

It is to be understood that the invention is adapted for use in numerous fields, and that it may be variously modified in its several details, as by the omission or addition of elements, or by the substitution of equivalents for elements shown and hereinabove described, without departing from the spirit or sacrificing the substantial advantages thereof.

What we claim as new, and desire to secure by Letters Patent, is—

1. A control for motor-driven apparatus comprising, in combination with the drive-motor and a machine element adapted by adjustment to control the working load on the motor, of an auxiliary motor operatively connected with the machine element and adapted to control the adjustment thereof, automatic means for controlling the operation of the auxiliary motor comprising a reversing switch with normally open contacts actuated by two electromagnets to oppositely connect the auxiliary motor with a source of electrical energy, a potential transformer with primary winding connected across the drive-motor circuit, a current transformer in a lead of the drive-motor circuit, a double-throw relay with coil connected across the current transformer circuit, a rheostat set in and controlling a by-pass around the coil of the relay, and circuit connections controlled by the relay connecting the magnet coils of the reversing switch in circuit with the secondary winding of the potential transformer whereby the auxiliary motor will be operated to shift the adjustment of the machine element to effect an increase of load on the drive-motor whenever the current through the coil of the relay falls below the value determined by the setting of the rheostat and to effect a decrease in such load whenever the current through the coil of the relay rises above the value so determined by the rheostat, and manually actuated means for controlling the operation of the auxiliary motor including an interlock hand switch with a set of contacts adapted to close a short circuit around the rheostat in the by-pass around the coil of the relay and a second set of contacts adapted to break the connection between the contacts of the relay and the magnet coils of the reversing switch, and circuit connections with the circuits of the two magnet coils of the reversing switch controlled respectively by two hand switches.

2. A control for motor-driven apparatus comprising, in combination with the drive-motor and a machine element adapted by adjustment to control the working load on the motor, of an auxiliary motor operatively connected with the machine element and adapted to control the adjustment thereof, means including a potential transformer with primary winding connected across the drive-motor circuit and a reversing switch with actuating coils in circuit with the secondary winding of the potential transformer for operating the auxiliary motor in either direction, automatic means including a current transformer in one lead of the drive-motor circuit and a double-throw current relay controlled by a predetermined adjustable portion of the current from the current transformer for controlling the circuits of the actuating coils of the reversing switch, and manually actuated means including hand switches adapted respectively to close a short circuit around the coil of the relay and to break the connection between the contacts of the relay and the circuits of the actuating coils of the reversing switch and thereafter to control the circuits of said actuating coils independently of the relay, whereby the adjustment of the grinding element of the machine may be shifted either automatically to produce and maintain substantially constant a working load of predetermined value on the drive-motor or as desired by a manipulation of the hand switches.

OSCAR STAMETS.
LEON A. DUCKWORTH.